United States Patent [19]

Iwata et al.

[11] 4,252,428
[45] Feb. 24, 1981

[54] RADIO-RECEIVER-BUILT-IN FLASH CAMERA

[75] Inventors: Hiroshi Iwata, Nara; Youichi Daimaru, Hirakata, both of Japan

[73] Assignees: West Electric Company, Ltd., Osaka; Matsushita Electric Industrial Co., Ltd., Kadoma, both of Japan

[21] Appl. No.: 6,489

[22] Filed: Jan. 25, 1979

[30] Foreign Application Priority Data

Jan. 31, 1978 [JP] Japan .................................. 53/10094

[51] Int. Cl.³ .......................................... G03B 29/00
[52] U.S. Cl. ..................... 354/76; 354/131; 354/354
[58] Field of Search ................... 354/75, 76, 145, 354; 307/38, 112, 115

[56] References Cited

U.S. PATENT DOCUMENTS

| | | | |
|---|---|---|---|
| 3,246,587 | 4/1966 | Oliver | 354/76 |
| 3,439,598 | 4/1969 | Weitzner et al. | 354/76 |
| 3,792,486 | 2/1974 | Lange | 354/76 |
| 4,086,582 | 4/1978 | Kiyohara et al. | 354/145 |
| 4,112,447 | 9/1978 | Iwata | 354/145 |
| 4,148,573 | 4/1979 | Yamanaka | 354/145 |

FOREIGN PATENT DOCUMENTS

| | | | |
|---|---|---|---|
| 709709 | 5/1965 | Canada | 354/76 |
| 2205652 | 8/1973 | Fed. Rep. of Germany | 354/76 |

Primary Examiner—L. T. Hix
Assistant Examiner—Stafford D. Schreyer
Attorney, Agent, or Firm—Cushman, Darby & Cushman

[57] ABSTRACT

A photographic camera including an electronic flash apparatus as well as a radio receiver, particularly a radio-receiver-built-in flash camera being provided with indication means capable of indicating both the state of the readiness for flashing of the electronic flash apparatus and the state of the tuning of the radio receiver.

24 Claims, 7 Drawing Figures

RADIO-RECEIVER-BUILT-IN FLASH CAMERA

BACKGROUND OF THE INVENTION

1. Field of Technology

The present invention relates to a photographic camera including an electronic flash apparatus as well as a radio receiver, particularly to indication means capable of indicating both the state of the readiness for the flashing of the electronic flash apparatus and the state of the tuning of the radio receiver.

2. Prior Art

Heretofore, at a chance of going on a hike or a picnic or making a trip, it is often the case desiring to carry both a camera and a portable radio at the same time, but it has been a great trouble for those individuals desiring the above to have those two rather heavy and bulky loads simultaneously. In this connection, if an electronic flash apparatus and a radio receiver can be built in a photographic camera, it will be a great convenience in those respects such that in a chance of a picnic or in a trip not only the photographings under the natural lights as well as with the flash lightings but also the reception of radio programs becomes possible with such a single composite apparatus.

Hereupon, the most necessary conditions for such the composite photographic camera are that it must be small in size so as to be suitable for carrying it and that both the electronic flash apparatus and the radio receiver operate accurately and exhibit fully their individual functions, then for this purpose it is necessary to take considerations with which the prevention of inaccurate operations of the radio receiver and the electronic flash apparatus eventually caused by individual users' misoperations can be accomplished.

SUMMARY OF THE INVENTION

The present invention is to offer a radio-receiver-built-in flash camera which can fully exhibit both the functions of a radio receiver and an electronic flash apparatus by means of being provided with an indication means capable of indicating accurately both the state of the readiness for the flashing of the electronic flashing apparatus and the state of the frequency tuning of the radio receiver.

DETAILED EXPLANATION OF THE PREFERRED EMBODIMENT

Figure 1:
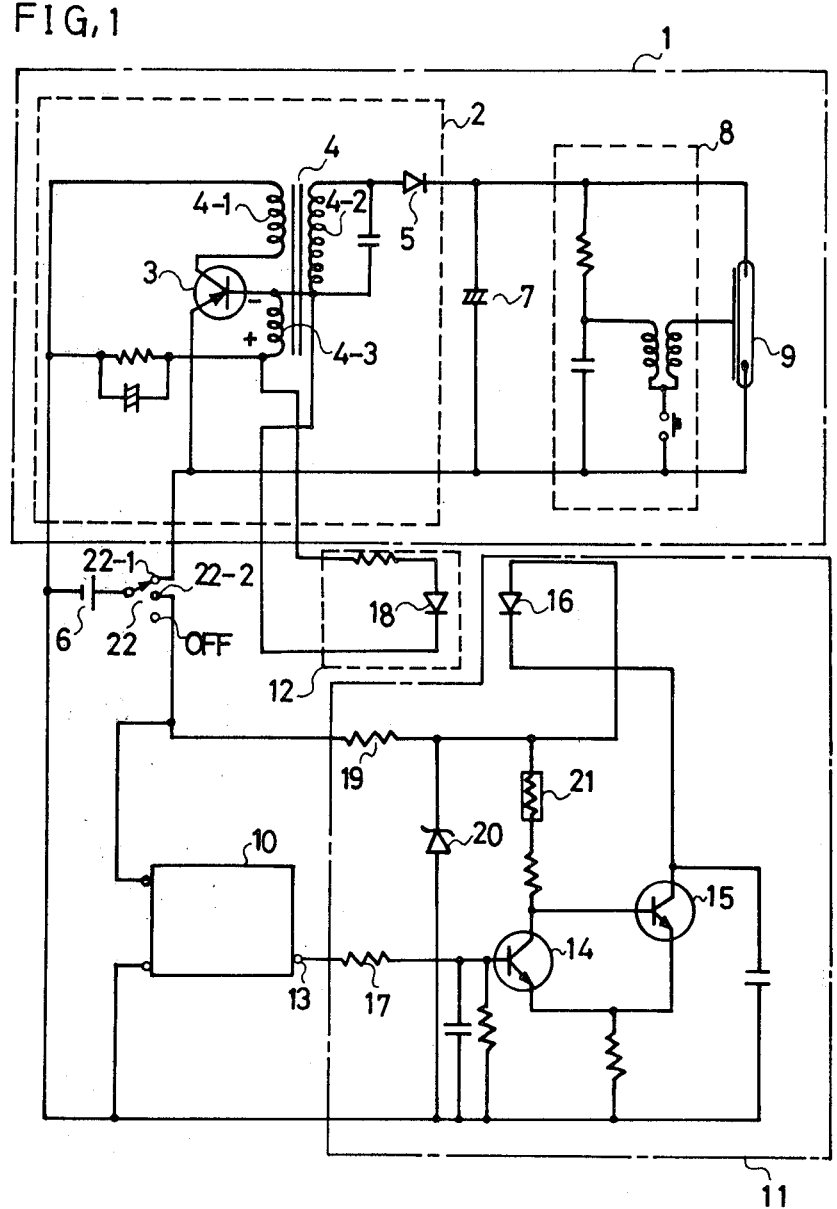
FIG. 1 is an electric circuit diagram of a first preferred embodiment of the radio-receiver-built-in flash camera of the present invention.

In FIG. 1, numeral 1 designates an electronic flash apparatus which comprises a main discharge capacitor 7, a trigger circuit 8, a flash discharge tube 9 and a DC-DC converter 2 which converts a voltage of a source battery 6 to a stepped-up DC voltage and is composed of an oscillator transistor 3, an oscillator transformer 4 having a primary winding 4-1, a secondary winding 4-2, and an auxiliary winding 4-3, and a rectifier diode 5. Numeral 10 designates a known radio receiver, and 11 is a tuning indication circuit with which the tuning indication is performed when the tuning in the radio receiver 10 is accomplished. Numeral 12 designates a voltage indication circuit with which the indication of a charging voltage of the main discharge capacitor 7 is performed with utilizing a voltage across the auxiliary winding 4-3 of the oscillator transformer 4 which increases in proportion with the increase of the charging voltage of the main capacitor 7. Besides, 22 is a change-over switch with which the connection from the source battery 6 either to the electronic flash apparatus or to the radio receiver is switched over.

The operation of the radio-receiver-built-in flash camera having the above described construction in accordance with the present invention will now be described with reference to the drawing accompanying the preferred embodiments.

Figure 2:
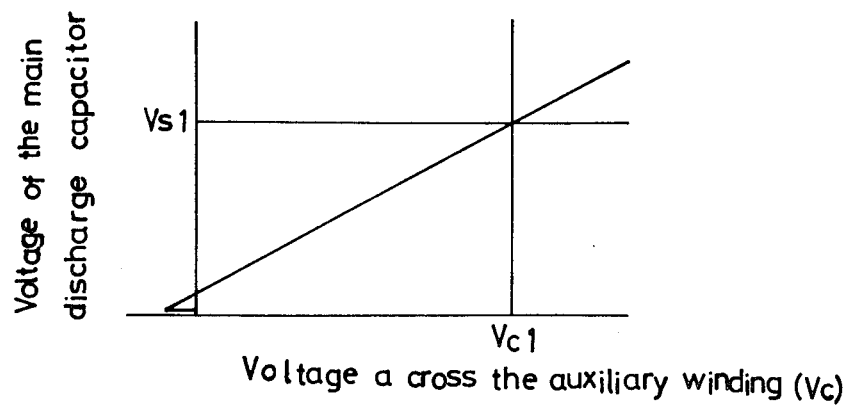
FIG. 2 is a graph illustrating the relation between a charging voltage of a main capacitor and a voltage across an auxiliary winding of an oscillator transformer used in the preferred embodiment of FIG. 1.

In case of using the electronic flash apparatus, the change-over switch 22 is turned to the side of a contact point 22-1, then the DC-DC converter 2 starts to work so as to charge up the main discharge capacitor 7 up to a certain high voltage. In proportion to this charging-up voltage of the main discharge capacitor 7 a voltage across terminals of the auxiliary winding 4-3 of the oscillator transformer 4 increases as shown in FIG. 2, and then when this voltage reaches a certain predetermined value of the voltage indication circuit 12, the light emitting diode 18 is lit. Therefore, in order to make indication for the reaching of the charging voltage of the main discharge capacitor 7 to a charging voltage Vs1 with which the flash discharge tube 9 is able to start to flash, the number of turns of the auxiliary winding 4-3 is adjusted so as to become Vc1, with which the light emitting diode 18 is lit, when the charging voltage reaches Vs1.

Next, in case of operating the radio receiver 10, the change-over switch 22 is turned to the side of a contact point 22-2, then the source battery 6 is connected to the radio receiver 10. Then, when the frequency tuning operation is performed, from an output terminal 13 of a detection circit (not shown) of the radio receiver 10, a negative-polarity output voltage being higher than that before the tuning is accomplished is fed out. This output voltage is applied to a transistor 14 through a resistor 17, thereby the transistor 14 is turned to the cut-off state from the prior state, and as the result of this, the base voltage of the transistor 15 is raised and thereby a current starts to flow into the base of the transistor 15 from a constant-voltage source, which comprises a resistor 19 connected to the source battery and a constant-voltage diode 20, through a temperature-sensitive element 21, thus the transistor 15 is turned to the conduction state.

Therefore, the light emitting diode 16, which is connected to the collector of transistor 15, is lit, thereby the accomplishment of the tuning is indicated. Hereupon, the temperature-sensitive element 21 mentioned above is used for the purpose of temperature compensation to prevent the instability of the operation in the transistors 14 and 15 cause by the ambient temperature fluctuation.

As has been described above, since the radio-receiver-built-in flash camera in accordance with the present invention is provided with the indication means which is capable of indicating both the state of readiness for the flashing of the electronic flash apparatus and the state of the frequency tuning of the radio receiver, individual users of this camera can operate it in accordance with each indication, thereby the electronic flash apparatus and of the radio receiver can be operated accurately and thus each function of them can then be exhibited fully.

Figure 3:
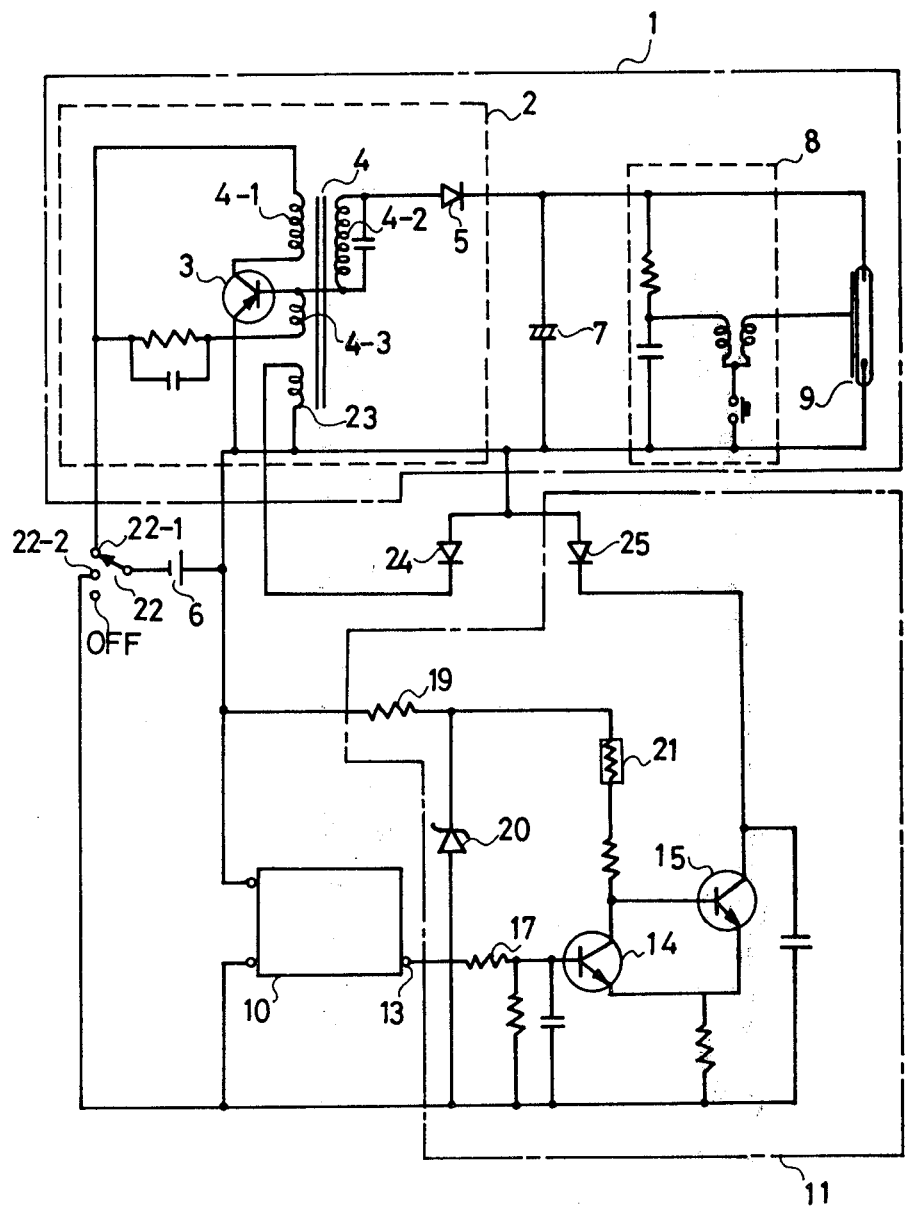
FIG. 3 is an electric circuit diagram of a second preferred embodiment of the radio-receiver-built-in flash camera of the present invention.

FIG. 3 shows another preferred embodiment of the present invention, wherein those elements having the same numerals as in the previous embodiment are the elements having the same functions.

In this preferred embodiment, a separate winding 23 is added to the oscillator transformer 4. This separate winding 23 generates a voltage across its terminals in proportion to the charging voltage of the main discharge capacitor 7. Numerals 24 and 25 designate light emitting diodes whose anodes are connected in common. A cathode of the light emitting diode 24 is connected to the separate winding 23 and a cathode of the light emitting diode 25 is connected to the collector transistor 15. In this embodiment, the change-over switch 22, which is the switch for changing over the functions of the electronic flash apparatus and the radio receiver, is inserted in the negative feed line from the source battery 6.

In case of operating the electronic flash apparatus by turning the change-over switch 22 to the side of the contact point 22-1, since a voltage proportional to the charging voltage of the main discharge capacitor 7 is generated at across the separate winding 23, the state of the main discharge capacitor 7 can be indicated with the light emitting diode 24 similarly as in the previous embodiment. Next, if the change-over switch 22 is turned to the side of the contact point 22-2 so as to operate the radio receiver, the transistor 15 is turned to the conduction state when the frequency tuning is accomplished similarly as in the previous embodiment and then a current flows from the source battery 6 to the light emitting diode 25, thereby this light emitting diode 25 is lit so as to indicate accomplishment of the tuning.

Figure 4:
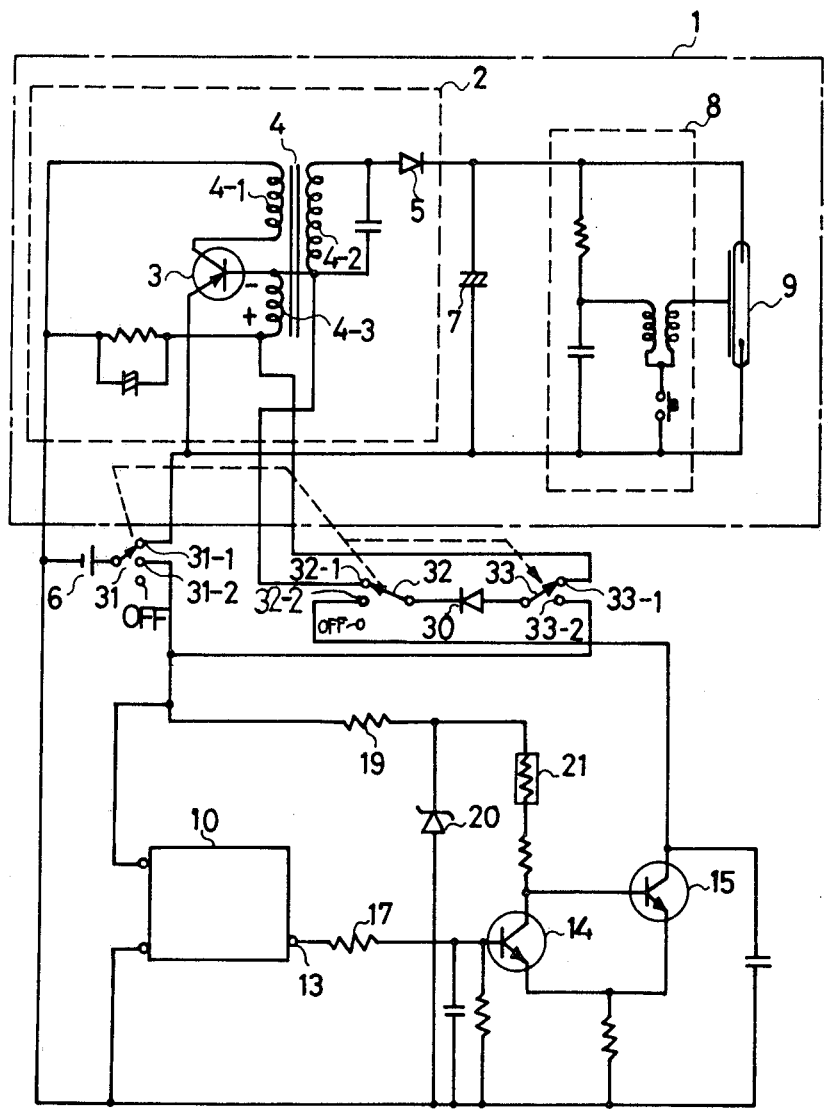
FIG. 4 is an electric circuit diagram of a third preferred embodiment of the radio-receiver-built-in flash camera of the present invention.

FIG. 4 shows still another preferred embodiment, wherein a single light emitting indicator element indicates both the state of the charging voltage of the main discharge capacitor of the electronic flash apparatus and the state of the frequency tuning operation of the radio receiver. In this embodiment, change-over switches 32 and 33, which are interlocked with the change-over switch 31 which is for changing over the electronic flash apparatus and the radio receiver, are inserted at both sides of the light emitting diode 30, thereby this light emitting diode 30 is switched to be connected to either the circuit of the electronic flash apparatus indicative or that of frequency tuning indication, and thus the each indication is performed with a single indicator element. Hereupon, those elements having the same numerals as in the embodiment of FIG. 1 are the elements having the same functions. If the change-over switch 31 is turned to the side of a contact point 31-1, then being interlocked with this change-over the switch 32 is turned to the side of a contact point 32-1 and the switch 33 is turned to the side of a contact point 33-1, thereby the light emitting diode 30 is connected to the auxiliary winding 4-3 of the oscillator transformer 4 and hence the charging voltage of the main discharge capacitor 7 is indicated similarly as in the embodiment of FIG. 1. Next, when the change-over switch 31 is turned to the side of the contact point 31-2, then being interlocked with this change-over, the switch 32 is turned to the side of the contact point 32-2 and the switch 33 is turned to the side of the contact point 33-2. Thereby the light emitting diode 30 is cut out from the auxiliary winding 4-3 of the oscillator transformer 4 and is inserted between the source battery 6 and the transistor 15, and hence the state of the tuning operation is indicated similarly as in the embodiment of FIG. 1.

In the foregoing preferred embodiments shown in FIG. 1, FIG. 3 and FIG. 4, the charging voltage of the main discharge capacitor in the electronic flash apparatus is indicated by lighting the light emitting diode according to detection of the voltages which is proportional to the charging voltage appearing across the auxiliary winding (FIGS. 1 and 4) or the separate winding of the oscillator transformer (FIG. 3). However, it is also possible to make the indication by lighting the light emitting diode according to some other method, for example, according to a voltage detection to be performed by connecting a known voltage detection circuit across both terminals of the main discharge capacitor.

Figure 5:
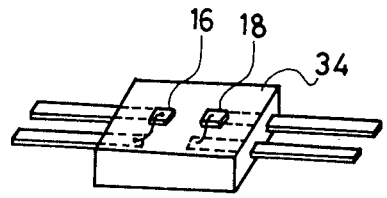
FIG. 5 is a perspective drawing illustrating a construction of a combination of light emitting diodes used in the preferred embodiment of FIG. 1 and FIG. 3.

In the foregoing explanation, as the light emitting indicator elements only the light emitting diodes have been used, but small-sized lighting bulb of some other sort can also be utilized. However, the light emitting diodes have certain advantage when a plural number of indicator elements are used. This will be with those light emitting diodes shown in FIG. 1 as basis for an example. With reference to FIG. 5, the light emitting diodes 16 and 18 can be moulded into or on a single plastic mould 34 and their terminal leads are disposed as shown in FIG. 5. If the plastic mould is formed with a milk-white diffusing material, its installation to the camera body case becomes very simple, because only a single small installation window need be provided to accept directly such a moulded light emitting diode and there through both the state of the readiness for the flashing of the electronic flash apparatus and the state of the frequency tuning of the radio receiver can be indicated. If small-sized lighting bulbs are used instead of the light emitting diodes, moulding of them into or on a single plastic mould is not always suitable because of their heat dissipation. In that event, two separated installation windows should be prepared on the camera body case and two lighting bulbs must be installed into these two windows separately. Thus the installation of the lighting bulbs has several inconveniences such that it requires not only more processes but also more space on the surface of camera body case in comparison with the case of installing the light emitting diodes.

Of course, it is also possible to mount two light emitting diodes in a single case, instead of moulding them into a single mould. By disposing a light diffuser on the side from which light emission is desired of the body, the indication and the recognition of both the state of the readiness for flashing of the electronic flashing apparatus and the state of the frequency tuning of the radio receiver become possible similarly as in the case of using the plastic mould.

Figure 6:
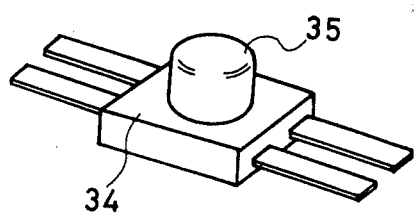
FIG. 6 is a perspective drawing illustrating a construction of a light emitting diode of FIG. 5 which is provided with a lens.

Furthermore, if a lens 35 as shown in FIG. 6 is disposed on the plastic mould 34 or on the case in which light emitting diodes are moulded or mounted, by installing the indicator mould or indicator case onto the camera body case in a manner that only the lens 35 is exposed on the surface of the camera body case, the indication and its recognition can be made through a very small-sized window.

Of course, it is needless to mention that the light emitting diodes used in the embodiment of FIG. 3 can also be constructed as shown in FIG. 5 or FIG. 6.

Figure 7:
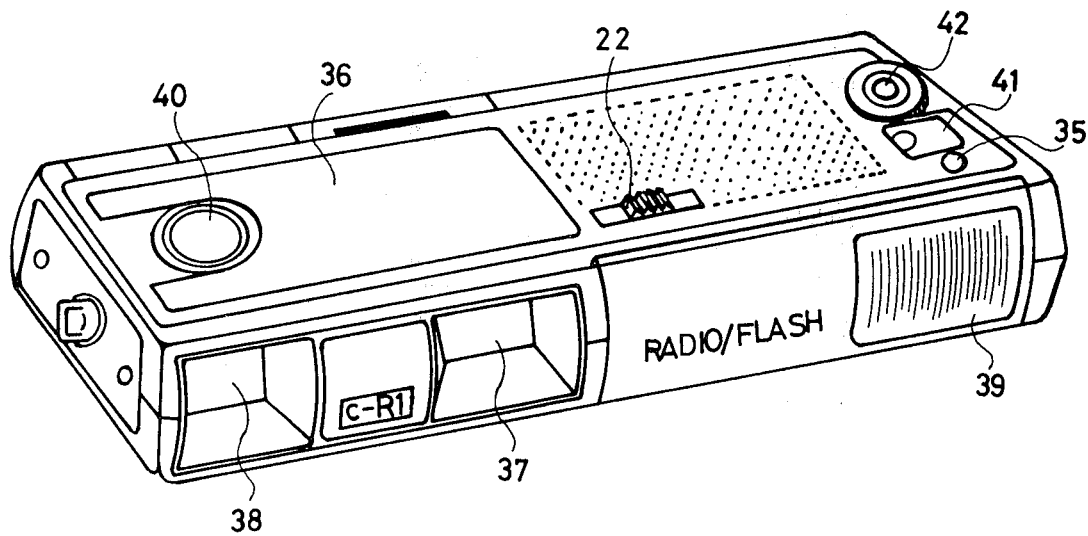
FIG. 7 is a perspective view illustrating a whole appearance of a practical embodiment example of the radio-receiver-built-in flash camera of the present invention.

FIG. 7 is a perspective sketch illustrating a whole appearance of a practical embodiment example of the radio-receiver-built-in flash camera of the present invention. In this embodiment example, on the front side of the camera body 36, a camera lens 37, a camera finder 38, and a flash window 39, in which the flash 9 is installed, are disposed. On the top face of the camera body 36, on the left a camera shutter 40, on the middle the change-over switch 22, and on the right a tuning dial 41 and a tuning knob 42, are arranged, respectively, so as to prevent misoperation between the electronic flash apparatus and the radio receiver. The indicator 35, an example of which is shown in FIG. 6 and indicates both the state of the readiness for the flash of the flash apparatus and the state of the frequency tuning of the radio receiver, is arranged near the tuning dial 41 and in a very small space on the top face of the camera body 36, thereby not only the easiness of the tuning operation of the radio receiver but also the reliability of recognition of the state of the readiness of the electronic flash apparatus are considered.

As has been described above, in the radio-receiver-built-in flash camera of the present invention, because indication means are provided which indicate both the state of the readiness for the flashing of the electronic flash apparatus and the state of the frequency tuning of the radio receiver, both the electronic flash apparatus and the radio receiver can respectively be operated accurately. Furthermore, in the case that two lighting indicator elements are used as the indication means, by using two indicator elements emitting two different colors, the indication and its recognition of both the state of the readiness for the flash of the electronic flash apparatus and the state of frequency tuning of the radio-receiver become still more distinctive and clear, so that even greater accuracy of operations is expected.

What we claim is:

1. A radio-receiver-built-in flash camera comprising:
a radio receiver and an electronic flash apparatus whose flash discharge tube is flashed with the electrical energy of a main discharge capacitor charged up from a source battery through a DC-DC converter which comprises an oscillator transistor and an oscillator transformer having a primary winding, a secondary winding, and an auxiliary winding, said converter converting a voltage of the source voltage to a stepped-up DC voltage;
a voltage indication circuit comprising a first light emitting diode is lit by said voltage indication circuit when a charging voltage of said main discharge capacitor reaches a predetermined value;
a tuning indication circuit comprising a second light emitting diode which is lit by said tuning indication circuit of said radio receiver when the frequency tuning of said radio receiver is accomplished; and
a change-over switch by which the feeding of the electrical energy from said source battery is directed to a selected one of the pairs of said radio receiver and said tuning indication circuit; and said electronic flash apparatus and said voltage indication circuit;
said voltage indication circuit being configured in a manner that the first emitting diode is connected to the auxiliary winding generating a light emitting diode driving voltage proportional to the charging voltage of the main discharge capacitor and said first light emitting diode is lit in accordance with the generating voltage of said auxiliary winding, said light emitting driving voltage being sufficiently lower than the voltage of said main discharge capacitor; and
said tuning indication circuit being configured in a manner to be operated by the output from the radio receiver and further comprising a current feeding circuit which enables the current feed from the source battery to the second light emitting diode.

2. A radio receiver-built-in flash camera comprising:
a radio receiver and an electronic flash apparatus whose flash discharge tube is flashed with the electrical energy of a main discharge capacitor charged up from a source battery through a DC-DC converter which comprises an oscillator transistor and an oscillator transformer having a primary winding, a secondary winding, and an auxiliary winding, said converter converting a voltage of the source voltage to a stepped-up DC voltage;
a voltage indication circuit comprising a first light emitting diode which is lit by said voltage indication circuit when a charging voltage of said main discharge capacitor reaches a predetermined value;
a tuning indication circuit comprising a second light emitting diode which is lit by said tuning indication circuit of said radio receiver when the frequency tuning of said radio receiver is accomplished; and
a change-over switch by which the feeding of the electrical energy from said source battery is directed to a selected one of the pairs of said radio receiver and said tuning indication circuit, and said electronic flash apparatus and said voltage indication circuit;
the voltage indication circuit further comprising a circuit connected to said auxiliary winding for detecting the voltage of the main discharge capacitor,
the first light emitting diode being lit by the output of said voltage indication circuit, and
the tuning indication circuit being configured in a manner to be operated by the output from the radio receiver and further comprising a current feeding circuit which enables the current feed from the source battery to the second light emitting diode.

3. A radio-receiver-built-in flash camera of claim 1 or 2, wherein the respective emitted colors of the first light emitting diode and the second light emitting diode are different.

4. A radio-receiver-built-in flash camera of claim 1 or claim 2 wherein the first light emitting diode and the second light emitting diode are moulded in a single plastic mould.

5. A radio-receiver-built-in flash camera of claim 4 wherein a lens is provided at the top face of the plastic mould.

6. A radio-receiver-built-in flash camera comprising:

a radio receiver and an electronic flash apparatus whose flash discharge tube is flashed with the electrical energy of a main discharge capacitor charged up from a source battery through a DC-DC converter which comprises an oscillator transistor and an oscillator transformer having a primary winding, a secondary winding, and an auxiliary winding, said converter converting a voltage of the source voltage to a stepped-up DC voltage;

a voltage indication circuit which makes a light emitting diode emit light when a charging voltage of said main discharge capacitor reaches a predetermined value;

a tuning indication circuit which operates by the output of said radio receiver and makes said light emitting diode emit light wnen the frequency tuning of the radio receiver is accomplished;

a change-over switch by which the current feeding from said source battery is directed to a selected one of the pairs of said radio receiver and said tuning indication circuit, and said electronic flash apparatus and said voltage indication circuit; and an interlocked switch which is interlocked to the switching movement of said change-over switch and changes over the connection of said light emitting indicator element to a selected one of said voltage indication circuit and said tuning indication circuit;

said voltage indication circuit being configured in a manner that the light emitting diode is lit in accordance with a generating light emitting diode drive voltage across the auxiliary winding which is proportional to the charging voltage of the main discharge capacitor, said light emitting diode driving voltage being sufficiently lower than the voltage of said main discharge capacitor;

said tuning indication circuit being configured in a manner to operate by the output of the radio receiver and further comprising a current feeding circuit for feeding the current from the source battery to said light emitting diode.

7. A radio-reciver-built-in flash camera of claim 6 wherein the voltage indication circuit is configured in a manner to include a voltage detection circuit which detects the charging voltage of the main discharge capacitor and makes the light emitting diode emit light in accordance therewith.

8. A radio-receiver-built-in flash camera comprising:
a radio receiver and an electronic flash apparatus whose flash discharge tube is flashed with the electrical energy of a main discharge capacitor charged up from a source battery through a DC-DC converter which comprises an oscillator transistor and an oscillator transformer having a primary winding, a secondary winding, an auxiliary winding, and a separate winding for generating a voltage in proportion to the charging voltage of said main discharge capacitor, said converter converting a voltage of the source battery to a stepped-up DC voltage;

a voltage indication circuit comprising a first light emitting diode which is configurated in a manner such that said first light emitting diode is connected to said separate winding provided in the oscillator transformer which generates a light emitting diode driving voltage proportional to the charging voltage of said main discharge capacitor and said first light emitting diode is lit in accordance with the generating voltage of said separate winding, said light emitting diode driving voltage being sufficiently lower than the voltage of said main discharge capacitor;

a tuning indication circuit which is configurated in a manner to operate by the output from the radio receiving comprising a second light emitting diode and a current feeding circuit which enables the current feed from the source battery to said second light emitting diode when the frequency tuning of said radio receiver is accomplished; and a change-over switch by which the feeding of the electrical energy from said source battery is directed to a selected one of the pairs of said radio receiver and said tuning indication circuit, and said electronic flash apparatus and said voltage indication circuit, wherein a terminal of one side of said first light emitting diode and a terminal of the same side of said second light emitting diode are connected in common and to a terminal of one side of said source battery.

9. A radio-receiver-built-in flash camera of claim 1 or claim 2 wherein the first light emitting diode and the second light emitting diode are mounted in a single case.

10. A radio-receiver-built-in flash camera of claim 9 wherein a lens is provided at the top face of the case.

11. A radio-receiver-built-in flash camera comprising:
a storage battery;
an electronic flash apparatus having a DC-DC converter for converting the voltage of said source battery to a stepped up DC voltage, a main discharge capacitor for receiving a charging voltage from said DC-DC converter, a trigger circuit for responding to said main discharge capacitor when said main discharge capacitor charges to a predetermined value of voltage, and a flash discharge tube for responding to the trigger circuit and providing a flash;

a voltage indication circuit coupled to said electronic flash apparatus and comprising a first light emitting diode, for indirectly detecting and indicating when the charging voltage across said main discharge capacitor reaches said predetermined value;

a radio receiver;

a tuning indication circuit coupled to said radio receiver and comprising a second light emitting diode for indicating when the frequency tuning of the radio receiver is accomplished; and a change-over switch coupled to said storage battery and selectively coupled to one of the pairs of said electronic flash apparatus and said voltage indication circuit, and said radio receiver and said tuning indication circuit in order to connect said storage battery to a desired one of said pairs.

12. A radio-receiver-built-in flash camera comprising:
a storage battery;
an electronic flash apparatus comprising a DC-DC converter for converting the voltage of said source battery to a stepped up DC voltage, said DC-DC converter including an oscillator transistor and an oscillator transformer having a primary winding, a secondary winding, and an auxiliary winding, a main discharge capacitor for receiving a charging voltage from said DC-DC converter, a trigger circuit for responding to said main discharge capacitor when said main discharge capacitor charges to a predetermined value of voltage, and a flash discharge tube for responding to the trigger circuit and providing a flash, wherein a voltage develops across said auxiliary winding which is proportional to the charging voltage received by said discharge capacitor;

a voltage indication circuit coupled to the auxiliary winding of said DC-DC converter and comprising a first light emitting diode for indicating when the charging voltage across said main discharge capacitor reaches said predetermined value;

a radio receiver;

a tuning indication circuit comprising a second light emitting diode and a current feeding circuit, said current feeding circuit coupled to said radio receiver for enabling the current feed from said storage battery to said second light emitting indicator element for indicating when the frequency tuning of said radio receiver is accomplished; and a change-over switch coupled to said storage battery and selectively coupled to one of the pairs of said electronic flash apparatus and said voltage indication circuit, and said radio receiver and said tuning indication circuit in order to connect said storage battery to a desired one of said pairs.

13. A radio-receiver-built-in flash camera comprising:

a storage battery;

an electronic flash apparatus comprising a DC-DC converter for converting the voltage of said source battery to a stepped up DC voltage, said DC-DC converter including an oscillator transistor and an oscillator transformer having a primary winding, a secondary winding, an auxiliary winding, and a separate winding, a main discharge capacitor for receiving a charging voltage from said DC-DC converter, a trigger circuit for responding to said main discharge capacitor when said main discharge capacitor charges to a predetermined value of voltage, and a flash discharge tube for responding to the trigger circuit and providing a flash, wherein a voltage develops across said separate winding which is proportional to the charging voltage received by said discharge capacitor;

a voltage indication circuit comprising a first light emitting diode having a first end and a second end, the first end of said first light emitting indicator element coupled to said separate winding and the second end of said first light emitting indicator element coupled to one end of said storage battery for indicating when a charging voltage of said main discharge capacitor reaches said predetermined value;

a radio receiver;

a tuning indication circuit for indicating when the frequency tuning of the radio receiver is accomplished comprising a second light emitting diode having a first end and a second end and a current feeding circuit, said current feeding circuit coupled to said radio receiver and to the first end of said second light emitting indicator element for enabling the current feed from said storage battery to said second light emitting indicator element, and the second end of said second light emitting indicator element coupled to the one end of said storage battery, whereby the second end of said first light emitting indicator element and the second end of said second light emitting indicator element are coupled to each other; and a change-over switch coupled to said storage battery and selectively coupled to one of the pairs of said electronic flash apparatus and said voltage indication circuit, and said radio receiver and said tuning indication circuit in order to connect said storage battery to a desired one of said pairs.

14. A radio-receiver-built-in flash camera as recited in claim 11, 12 or 13 wherein said first light emitting diodes emits light of one color and sid second light emitting diode emits light of a second color unlike the color emitted by said first light emitting diode.

15. A radio-receiver-built-in flash camera as recited in claim 11, 12 or 13 wherein said first light emitting diode and said second light emitting diode are molded into a single plastic mold.

16. A radio-receiver-built-in flash camera as recited in claim 15 further comprising a lens mounted at the top face of said plastic mold.

17. A radio-receiver-built-in flash camera as recited in claim 11, 12, or 13 wherein said first light emitting diode and said second light emitting diode are mounted in a case.

18. A radio-receiver-built-in flash camera as recited in claim 17 further comprising a lens mounted at the top face of said case.

19. A radio-receiver-built-in flash camera comprising:

a storage battery;

an electronic flash apparatus having a DC-DC converter for converting the voltage of said source battery to a stepped up DC voltage, a main discharge capacitor for receiving a charging voltage from said DC-DC converter, a trigger circuit for responding to said main discharge capacitor when said main discharge capacitor charges to a predetermined value of voltage, and a flash discharge tube for responding to the trigger circuit and providing a flash;

a voltage indication circuit coupled to said electronic flash apparatus for indirectly measuring a condition, said condition being when a charging voltage of said main discharge capacitor reaches said predetermined value;

a radio receiver;

a tuning indication circuit coupled to said radio receiver for measuring another condition, said another condition being when the frequency tuning of the radio receiver is accomplished;

a change-over switch coupled to said storage battery and selectively coupled to one of the pairs of said electronic flash apparatus and said voltage indication circuit, and said radio receiver and said tuning indication circuit in order to connect said storage battery to a desired one of said pairs;

an interlocking switch responsive to the switching movement of said change-over switch; and a light emitting diode coupled to said interlocking switch and selectively coupled by said interlocking switch to one of said voltage indication circuit and said tuning indication circuit for indicating one of said condition and said another condition respectively.

20. A radio-receiver-built-in flash camera comprising:

a storage battery;

an electronic flash apparatus comprising a DC-DC converter for converting the voltage of said source battery to a stepped up DC voltage, said DC-DC converter including an oscillator transistor and an oscillator transformer having a primary winding, a secondary winding, and an auxiliary winding, a main discharge capacitor for receiving a charging voltage from said DC-DC converter, a trigger circuit for responding to said main discharge capacitor when said main discharge capacitor charges to a predetermined value of voltage, and a flash discharge tube for responding to the trigger circuit and providing a flash, wherein a voltage develops across said auxiliary winding which is proportional to the charging voltage received by said discharge capacitor for indicating a condition, said condition being when a charging voltage of said main discharge capacitor reaches said predetermined value;

a radio receiver;

a tuning indication circuit comprising a current feeding circuit, said current feeding circuit coupled to said radio receiver for enabling the current feed from said storage battery for indicating another condition, said another condition being when the frequency tuning of the radio receiver is accomplished;

a change-over switch coupled to said storage battery and selectively coupled to one of the pairs of said electronic flash apparatus and said voltage indication circuit, and said radio receiver and said tuning indication circuit in order to connect said storage battery to a desired one of said pairs;

an interlocking switch responsive to the switching movement of said change-over switch; and a light emitting diode coupled to said interlocking switch and selectively coupled by said interlocking switch to one of said voltage indication circuit and said tuning indication circuit for indicating one of said condition and said another condition respectively.

21. A radio-receiver-built-in flash camera as recited in claim 19 or 20 wherein said light emitting diode is molded into a single plastic mold.

22. A radio-receiver-built-in flash camera as recited in claim 21 further comprising a lens mounted at the top face of said plastic mold.

23. A radio-receiver-built-in flash camera as recited in claim 19 or 20 wherein said light emitting diode is mounted in a case.

24. A radio-receiver-built-in flash camera as recited in claim 23 further comprising a lens mounted at the top face of said case.

* * * * *